United States Patent
Honda

(10) Patent No.: US 7,499,083 B2
(45) Date of Patent: Mar. 3, 2009

(54) IMAGE SENSING APPARATUS WITH WHITE BALANCE CONTROL AND IMAGE SENSING METHOD THEREFOR

(75) Inventor: Yoshiaki Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 11/027,373

(22) Filed: Dec. 30, 2004

(65) Prior Publication Data

US 2005/0151856 A1 Jul. 14, 2005

(30) Foreign Application Priority Data

Jan. 8, 2004 (JP) .............. 2004-003208

(51) Int. Cl.
*H04N 9/73* (2006.01)
(52) U.S. Cl. ............... 348/224.1; 348/223.1; 348/229.1
(58) Field of Classification Search .............. 348/223.1, 348/224.1, 229.1
See application file for complete search history.

(56) References Cited

U.S. PATENT DOCUMENTS

| | | | | |
|---|---|---|---|---|
| 3,971,065 A | * | 7/1976 | Bayer | ............ 348/276 |
| 6,727,942 B1 | * | 4/2004 | Miyano | ............ 348/223.1 |
| 7,295,720 B2 | * | 11/2007 | Raskar | ............ 382/312 |
| 2004/0017594 A1 | * | 1/2004 | Suekane et al. | ............ 358/516 |

FOREIGN PATENT DOCUMENTS

| | | | |
|---|---|---|---|
| JP | 11133476 A | * | 5/1999 |
| JP | 02-085834 | | 3/2002 |

* cited by examiner

*Primary Examiner*—Sinh N Tran
*Assistant Examiner*—Anthony J Daniels
(74) *Attorney, Agent, or Firm*—Morgan&Finnegan, LLP

(57) ABSTRACT

An image sensing apparatus calculates the first white balance control data on the basis of representative values of data for respective color components for at least some of image sensing data, or data of average values of the color components. The apparatus calculates the second white balance control data obtained by correcting the first white balance control data on the basis of the correlation between the first flashing information sent from an electronic flash device and the second flashing information sent from the electronic flash device in photography. The apparatus performs white balance adjustment in regular photography using the second white balance control data.

15 Claims, 10 Drawing Sheets

FIG. 3

| AMOUNT OF PHOTOFLASH LIGHT | 1/1 | 1/2 | 1/4 | 1/8 | 1/16 |
|---|---|---|---|---|---|
| RGain | R0 | R1 | R2 | R3 | R4 |
| BGain | B0 | B1 | B2 | B3 | B4 |

FIG. 4

| AMOUNT OF PHOTOFLASH LIGHT | 1/1 | 1/2 | 1/4 | 1/8 | 1/16 | 1/1 | 1/2 | 1/4 | 1/8 | 1/16 |
|---|---|---|---|---|---|---|---|---|---|---|
| FLASHING VOLTAGE | 320 | 320 | 320 | 320 | 320 | 300 | 300 | 300 | 300 | 300 |
| RGain | R0 | R1 | R2 | R3 | R4 | R5 | R6 | R7 | R8 | R9 |
| BGain | B0 | B1 | B2 | B3 | B4 | B5 | B6 | B7 | B8 | B9 |

FIG. 5

| R | G1 |
|---|----|
| G2 | B |

FIG. 8

| AMOUNT OF PHOTOFLASH LIGHT | 1/1 | 1/2 | 1/4 | 1/8 | 1/16 |
|---|---|---|---|---|---|
| RGain | R00 | R01 | R02 | R03 | R04 |
| BGain | B00 | B01 | B02 | B03 | B04 |

FIG. 9

| AMOUNT OF PHOTOFLASH LIGHT | 1/1 | 1/2 | 1/4 | 1/8 | 1/16 |
|---|---|---|---|---|---|
| RGain | R10 | R11 | R12 | R13 | R14 |
| BGain | B10 | B11 | B12 | B13 | B14 |

IMAGE SENSING APPARATUS WITH WHITE BALANCE CONTROL AND IMAGE SENSING METHOD THEREFOR

FIELD OF THE INVENTION

The present invention relates to an image sensing apparatus having a light-emitting unit such as an electronic flash and perform image sensing through a plurality of color filters, and a flashgun and an image sensing method and image sensing system using the image sensing apparatus, and a program for them.

BACKGROUND OF THE INVENTION

In processing color image signals obtained by a plurality of image sensing devices with different color filters, white balance adjustment is performed for the color image signals. In white balance adjustment, faithful color reproduction of a sensed image is implemented by determining the color temperature of a light source for the sensed image and adjusting the white balance such that the sensed image becomes achromatic.

White balance adjustment methods include a method of determining the color temperature of the light source using a colorimetric element, a method of searching for an achromatic portion in the sensed image and determining the color temperature of the portion, and the like. In some cases, these methods cannot accurately adjust the white balance due to erroneous detection of the color of the light source or the like.

One of the most accurate white balance adjustment methods is a method of image-sensing an achromatic object (to be referred to as white-paper image sensing hereinafter), calculating a control value such that the proportions of the color components of a sensed image signal are equal to each other, and performing white balance adjustment using the control value in photography after that (to be referred to as manual white balance (MWB) hereinafter).

It is known that the photoflash light color temperature of an electronic flash used in photography changes depending on photoflash light conditions such as a voltage across two terminals of a flashbulb, the amount of photoflash light, and the like. The photoflash light color temperature becomes high when a voltage to be applied to the electronic flash is high or the amount of photoflash light is small while it becomes low when the applied voltage is low or the amount of photoflash light is large.

FIG. 10 is a graph showing the relationship between the amount of photoflash light of an electronic flash and the photoflash light color temperature.

For example, assume that white-paper image sensing and MWB are performed when the amount of photoflash light of the electronic flash is "1/2". In this case, a control value corresponding to a color temperature T2 is calculated, and accurate white balance adjustment is performed.

If a plurality of types of electronic flash devices can be used in an electronic still camera, the camera side performs white balance correction of photoflash light by notifying the camera side of the color temperature information of an electronic flash device to be used. Some electronic still cameras correct an output from a color temperature setting circuit in accordance with a time period from the start of photoflash to the stop (see Japanese Patent Laid-Open No. 02-85834).

However, if MWB is set for the amount of photoflash light of a certain electronic flash in the above-mentioned manner, and the amount of photoflash light of the electronic flash changes to "1/1" in subsequent electronic flash photography, the photoflash light color temperature becomes T1 in FIG. 10 which is a color temperature lower than T2. If white-paper image sensing data when the amount of photoflash light is "1/2" is used in this state, an image turns red, and accurate white balance adjustment cannot be performed. On the contrary, if the amount of photoflash light changes to "1/4" in next electronic flash photography, the photoflash light color temperature becomes T3 which is a color temperature higher than T2. If white-paper image sensing data when the amount of photoflash light is "1/2" is used in this state, an image turns blue, and accurate white balance adjustment cannot be performed. Therefore, to perform accurate white balance adjustment in photoflash light, white-paper image sensing needs to be performed for each amount of photoflash light of an electronic flash device.

SUMMARY OF THE INVENTION

The present invention has been made in consideration of the above-mentioned problems, and has as its feature to provide a technique which can accurately adjust the white balance in subsequent electronic flash photography by only one white-paper image sensing operation even when the amount of photoflash light of an electronic flash device changes.

According to the present invention, there is provided with an image sensing apparatus comprising: light-emitting means for irradiating an object with light; input means for inputting flashing information of the light-emitting means; image sensing means, comprising a plurality of color filters with different spectral characteristics, for converting light from the object to obtain image sensing data; first white balance control data generation means for generating white balance control data on the basis of first image sensing data obtained by image-sensing a first object by the image sensing means using the light-emitting means; second white balance control data generation means for generating second white balance control data obtained by correcting the first white balance control data, on the basis of first flashing information of the light-emitting means when the first object is image-sensed and second flashing information of the light-emitting means when a second object is to be photographed, the first flashing information and second flashing information being input from the input means; and white balance adjustment means for adjusting white balance of image sensing data obtained by image-sensing the second object, on the basis of the second white balance control data.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 depicts a table for explaining the relationship between the amount of photoflash light of an electronic flash and the white balance gains according to the first embodiment;

FIG. 4 depicts a table for explaining the relationship between the amount of photoflash light of an electronic flash, the flashing voltage, and the white balance gains according to the first embodiment;

FIG. 5 depicts a view for explaining color filters according to the first embodiment;

FIG. 8 depicts a table for explaining the relationship between the amount of photoflash light of the first electronic flash device and the white balance gains according to the second embodiment;

FIG. 9 depicts a table for explaining the relationship between the amount of photoflash light of the second electronic flash device and the white balance gains according to the second embodiment.

DETAILED DESCRIPTION OF THE PREFERRED EMBODIMENTS

Preferred embodiments of the present invention will be described in detail below with reference to the accompanying drawings.

First Embodiment

Figure 1:
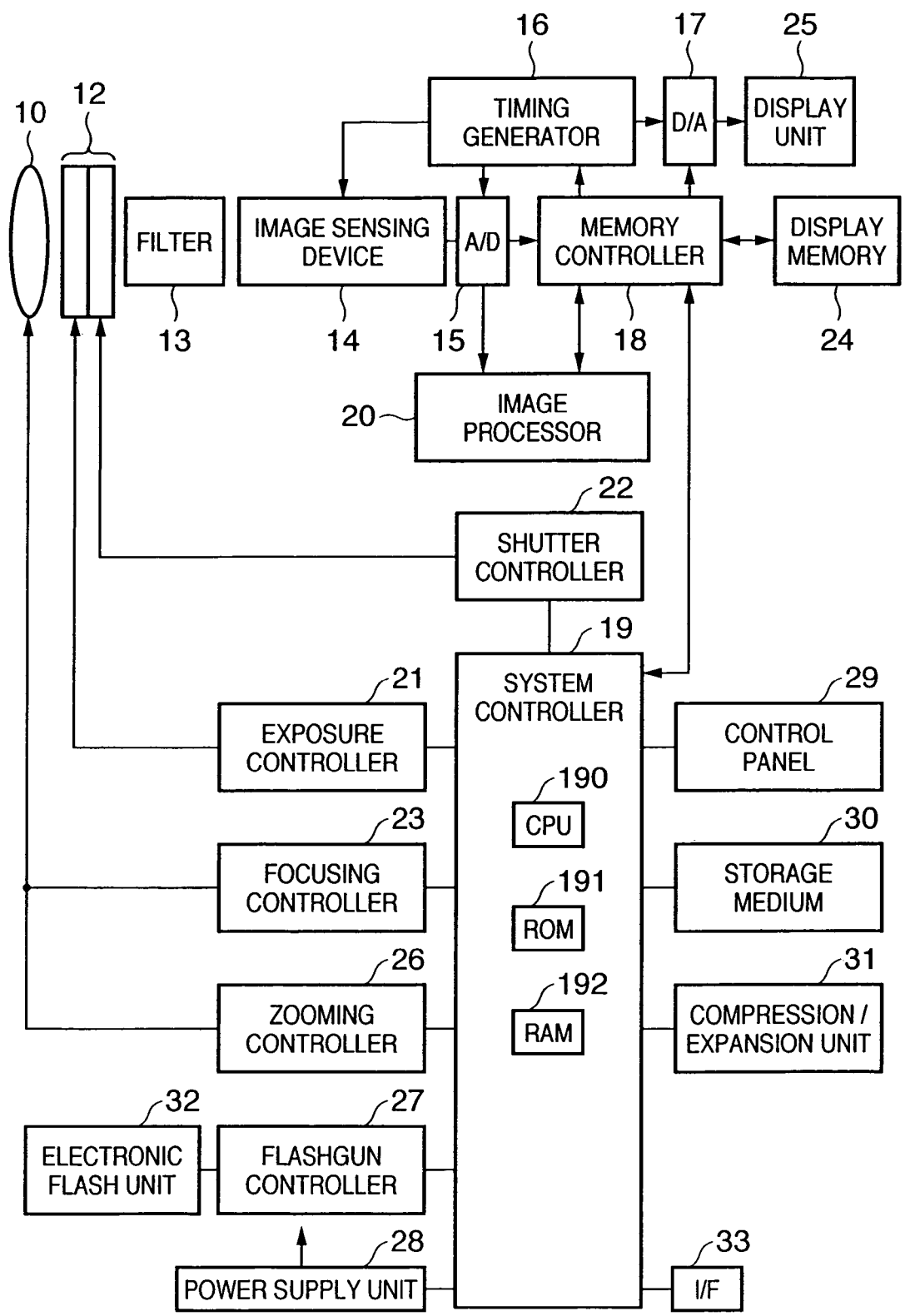
FIG. 1 is a block diagram showing the arrangement of the main part of an image sensing apparatus according to the first embodiment of the present invention.

FIG. 1 is a block diagram showing the arrangement of the main part of an image sensing apparatus (e.g., an electronic still camera) according to the first embodiment of the present invention.

Figure 5:
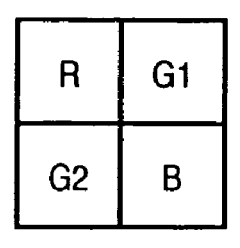

In FIG. 1, reference numeral 10 denotes a photographing lens; and numeral 12 denotes an iris and shutter. A color filter 13 comprises, e.g., color filters of four colors, as shown in FIG. 5. Image sensing devices (CCDs) 14 correspond to the color filters and convert optical images of the respective colors into electrical signals. An A/D converter 15 converts analog signals of the respective colors output from the image sensing devices 14 into digital signals. A timing generator 16 supplies a clock signal or control signal to the image sensing devices 14, the A/D converter 15, and a D/A converter 17 to control the operation of the units. The timing generator 16 is controlled by a memory controller 18 and system controller 19. An image processor 20 performs predetermined pixel interpolation processing and color conversion processing for data from the A/D converter 15 or that from the memory controller 18. The image processor 20 also performs predetermined arithmetic operation processing using sensed image data. The system controller 19 controls an exposure controller 21, a shutter controller 22 for controlling the movement of the iris and shutter 12, and focusing controller 23, on the basis of the obtained operation result.

The memory controller 18 controls the operation of the A/D converter 15, timing generator 16, image processor 20, display memory 24, and D/A converter 17. With this operation, digital data A/D-converted by the A/D converter 15 is written to the display memory 24 through the image processor 20 and memory controller 18 or directly through the memory controller 18. The display memory 24 stores data to be displayed on a display unit 25. The data stored in the display memory 24 is output to the display unit 25 such as a TFT, LCD, or the like through the D/A converter 17 and is displayed on the display unit 25. The function as an electronic viewfinder can be implemented by sequentially displaying sensed image data on the display unit 25. The display unit 25 can arbitrarily turn on/off display in accordance with an instruction from the system controller 19. Turning off display makes it possible to greatly reduce power consumption of the image sensing apparatus.

The exposure controller 21 controls the shutter 12 having an iris function. The exposure controller 21 also performs an electronic flash light control function by working in conjunction with an electronic flash unit 32 whose light emission is controlled by a flashgun controller 27. The focusing controller 23 controls focusing of the photographing lens 10 and detects the distance of an object from the focusing position of the photographing lens 10. A zooming controller 26 controls zooming of the photographing lens 10. The flashgun controller 27 also has an AF auxiliary light projecting function and electronic flash control function. The exposure controller 21 and focusing controller 23 are controlled using the TTL (Through The Lens) scheme. On the basis of the result obtained from the image processor 20 by performing an arithmetic operation for sensed image data, the system controller 19 controls the exposure controller 21, focusing controller 23, and the like.

A power supply unit 28 comprises a primary cell such as an alkaline cell or lithium cell, a secondary cell such as an NiCd cell, NiMH cell, or Li cell, or an AC adapter and supplies power to the entire apparatus. A control panel 29 comprises a shutter switch, various operation buttons, and the like. A storage medium 30 is a medium for storing sensed image data like a memory card or the like.

The system controller 19 controls the operation of the entire image sensing apparatus. A CPU 190 is a microcomputer which controls the system controller 19 and performs control operation in accordance with a control program stored in a ROM 191. The ROM 191 further stores constants, variables, and the like for the operation of the system controller 19. A RAM 192 is a memory for storing photographed still images and moving images. The RAM 192 has a storage capacity large enough to store a predetermined number of still images or a moving image for a predetermined time. Accordingly, even in panoramic photography or continuous shooting for continuously taking a plurality of still images, a large quantity of images can quickly be written. The RAM 192 can also be used as a work area of the system controller 19. A compression/expansion unit 31 can compress and expand image data by, e.g., Adaptive Discrete Cosine Transformation (ADCT) or the like. The compression/expansion unit 31 can load image data stored in the RAM 192 to execute compression processing or can load compressed image data to execute expansion processing and write the processed data in the RAM 192. The image sensing apparatus is connected to an external device such as a PC, printer, or the like through an interface unit 33. Image data can be output to these external devices through the interface unit 33. An example of the interface unit 33 is a USB interface.

Figure 2:
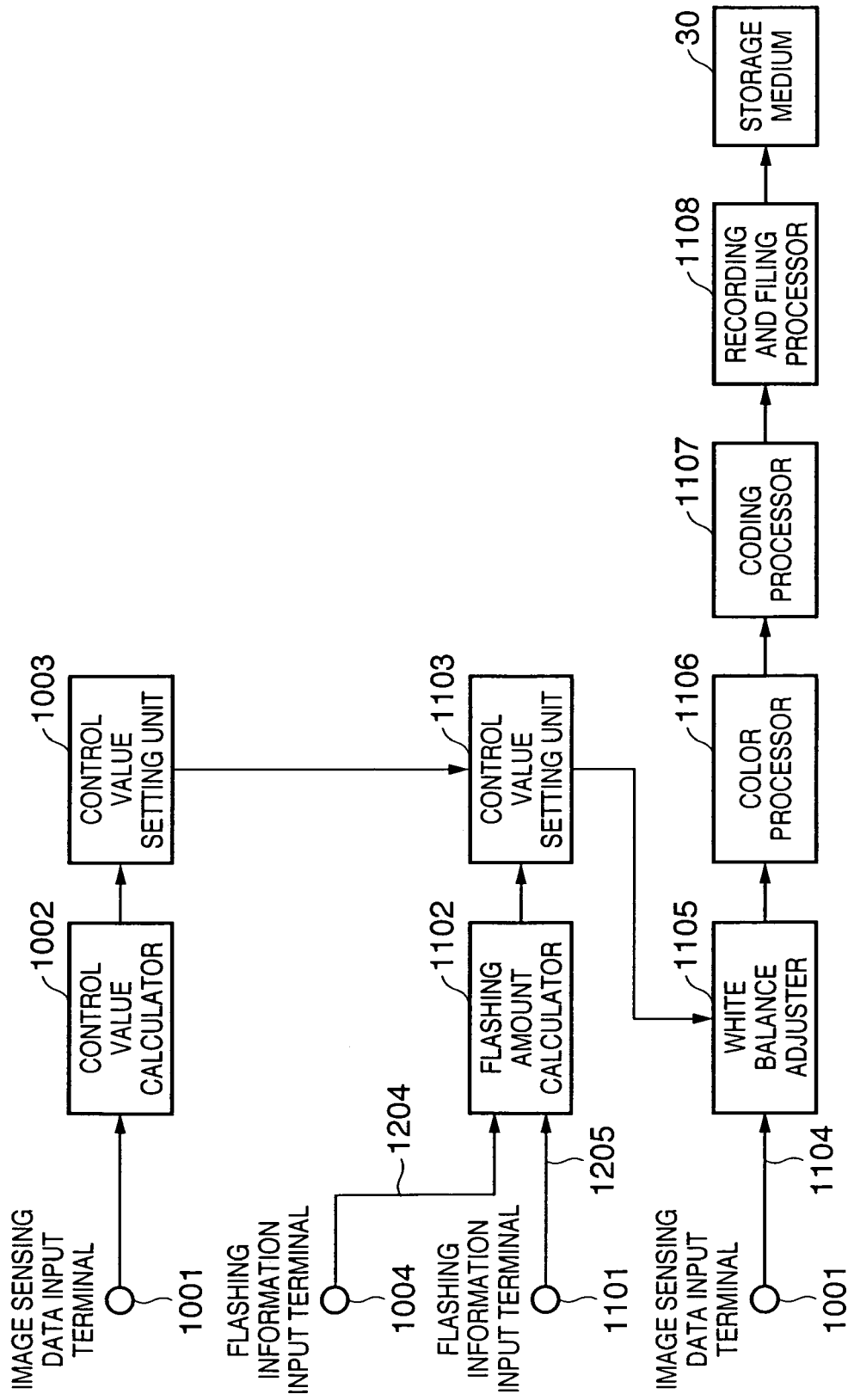
FIG. 2 is a functional block diagram for explaining MWB control using white-paper image sensing by the image sensing apparatus according to the first embodiment.

FIG. 2 is a functional block diagram for explaining MWB control using white-paper image sensing by the image sensing apparatus according to the first embodiment. This embodiment will describe a case wherein the system controller 19 performs MWB control. However, e.g., the image processor 20 may perform MWB control instead.

Referring to FIG. 2, image sensing data is input to an image sensing data input terminal 1001. To obtain the image sensing data, the image sensing devices 14 so arranged as to correspond to the four color filters of R, G1, G2, and B, as shown in FIG. 5, image-sense video input through the four color filters and convert the video into electrical signals, and the A/D converter 15 converts the electrical signals into digital data. A control value calculator 1002 extracts partial data (white-paper data) from image sensing data obtained by sensing an achromatic image (white-paper image) which is input from the image sensing data input terminal 1001. The control value calculator 1002 calculates a first white balance control value. At this time, the control value calculator 1002 calculates the first white balance control value for each of color signals R, G1, G2, and B such that the proportions of the average values of white-paper data of the color signals are equal to each other. A control value setting unit 1003 stores the first white balance control values obtained from the control value calculator 1002 in the RAM 192 of the image sensing apparatus.

A flashing information input terminal 1004 receives flashing information 1204 from the flashgun controller 27. The flashing information 1204 includes control information such as the amount of photoflash light, flashing voltage, and the like in photoflash calculated by the flashgun controller 27 in white-paper photography. A flashing amount calculator 1102 has a table representing the relationship between the flashing information 1204 and flashing information 1205 in an actual photography input from a flashing information input terminal 1101 (to be described later) and the white balance gains corresponding to white balance control values. By looking up the table, the white balance gains corresponding to the pieces of input flashing information 1204 and 1205 are output. Note that the flashing information 1205 is input from the flashgun controller 27, similarly to the flashing information 1204. A control value setting unit 1103 corrects the first white balance control values for the color signals R, G1, G2, and B set by the control value setting unit 1003 on the basis of the white balance gains obtained from the flashing amount calculator 1102. With this correction, second white balance control values for the color signals R, G1, G2, and B are calculated. A method of calculating the second control values will be described later in detail. A white balance adjuster 1105 performs white balance adjustment for image sensing data 1104 input from the image sensing data input terminal 1001 on the basis of the second white balance control values obtained from the control value setting unit 1103.

FIG. 3 depicts a table for explaining the relationship between the amount of photoflash light of the electronic flash unit 32 and the white balance gains. A table containing these data is provided in the flashing amount calculator 1102.

A white balance gain RGain is obtained by normalizing a white balance control value for R with G. A white balance gain BGain is obtained by normalizing a white balance control value for B with G. Referring to FIG. 3, if the amount of photoflash light of the electronic flash unit 32 is large, the control values are corrected to the lower color temperature side such that RGain becomes small (R0<R1<R2<R3<R4), and BGain becomes large (B0>B1>B2>B3>B4). On the other hand, if the amount of photoflash light of the electronic flash unit 32 is small, the control values are corrected to the higher color temperature side such that RGain becomes large, and BGain becomes small.

In this example, a case will be described wherein the amount of photoflash light of the electronic flash unit 32 in white-paper photography is "1/1", and that of the electronic flash unit 32 in an actual photography is "1/2".

If the amount of photoflash light is "1/1" in white-paper photography, information indicating that the amount of photoflash light is "1/1" as the flashing information 1204 is input to the flashing amount calculator 1102. With the relationship shown in FIG. 3, a set of values (R0,B0) are selected as the white balance gains (RGain and BGain) and are stored. Simultaneously with this, the control value calculator 1002 calculates first white balance control values on the basis of image sensing data input from the image sensing data input terminal 1001. The control value setting unit 1003 stores the first white balance control values in the RAM 192 for later MWB calculation.

In an actual photography, the flashing information 1205 indicating that the amount of photoflash light is "1/2" is input from the flashing information input terminal 1101 to the flashing amount calculator 1102. Then, a set of values (R1, B1) in FIG. 3 are selected as the white balance gains.

At this time, white balance gain differences ($\Delta R, \Delta B$) extracted from differences in amount of photoflash light between white-paper photography and actual photography are represented as follows:

$$\Delta R = R1 - R0$$

$$\Delta B = B1 - B0$$

The control value setting unit 1103 corrects white balance gains (Ra,Ba) set by the control value setting unit 1003 by the white balance gain differences. With this correction, white balance gains (Rb,Bb) after correction are represented as follows:

$$Rb = Ra + \Delta R$$

$$Bb = Ba + \Delta B$$

The control value setting unit 1103 calculates the white balance gains (Rb,Bb) by correcting the first control values on the basis of the differences. The control value setting unit 1103 converts the white balance gains into second white balance control values and sends them to the white balance adjuster 1105.

Image sensing data in an actual photography is input from the image sensing data input terminal 1001. The white balance adjuster 1105 performs white balance adjustment for the image sensing data using the second white balance control values set by the control value setting unit 1103.

Figure 6:
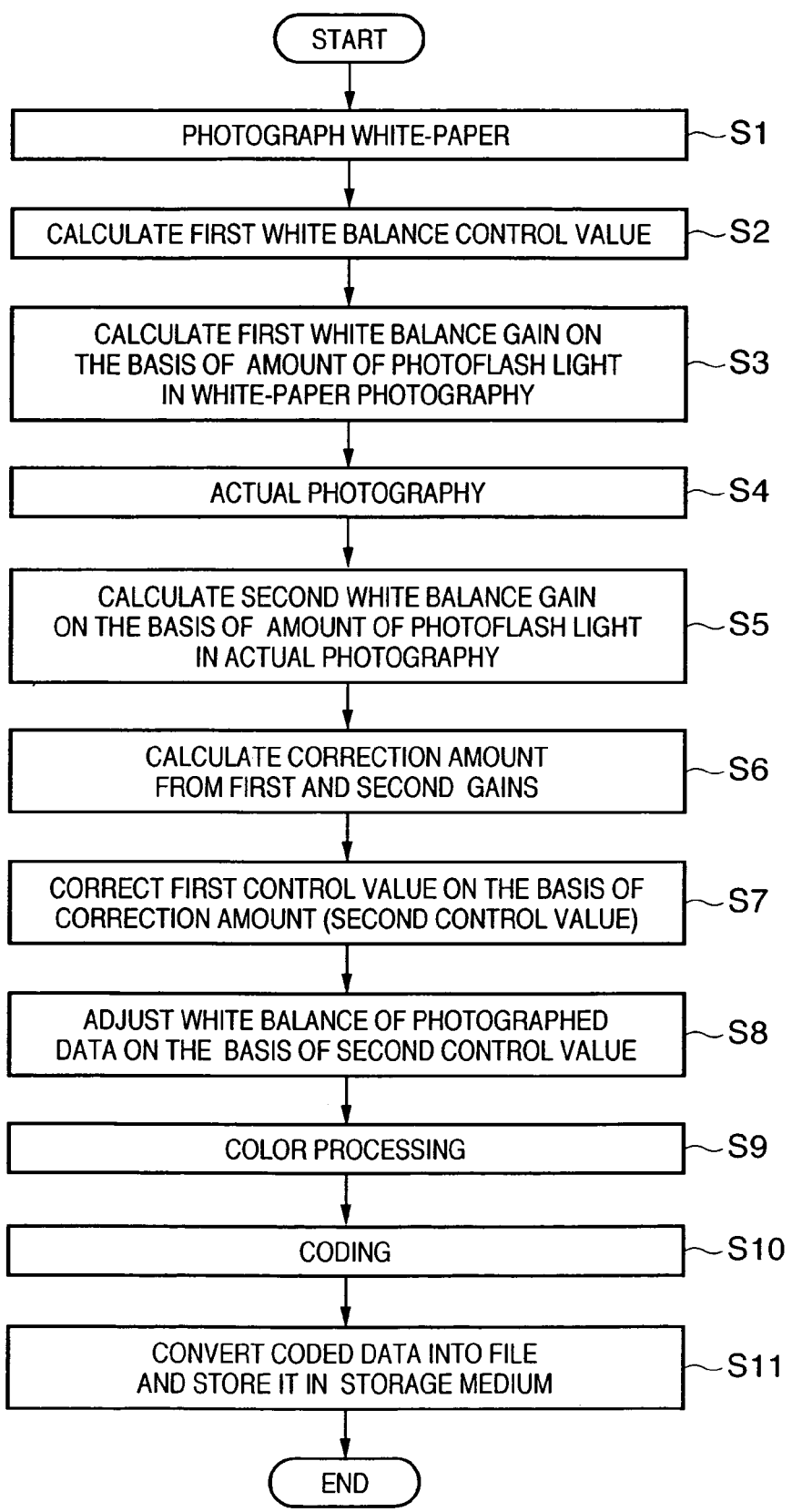
FIG. 6 is a flowchart for explaining MWB control using white-paper image sensing by the image sensing apparatus according to the first embodiment.

FIG. 6 is a flowchart for explaining the flow of an image sensing process in the image sensing apparatus according to the first embodiment of the present invention. A program for executing the process is stored in the ROM 191 and is executed under the control of the CPU 190.

In step S1, an image of white paper is photographed. In step S2, first white balance control values are calculated using some of image signals input from the image sensing devices 14 at that time. The process corresponds to the above-mentioned processing in the control value calculator 1002. In step S3, the flashing information 1204 indicating the amount of photoflash light of the electronic flash unit 32 in white-paper photography is input. On the basis of the flashing information 1204, first white balance gains in white-paper photography are obtained from the relationship shown in FIG. 3. The flashing information 1204 and first white balance gains are stored in the RAM 192.

The flow advances to step S4 to perform an actual photography. In step S5, the flashing information 1205 indicating the amount of photoflash light of the electronic flash unit 32 in the actual photography is input. On the basis of the amount of photoflash light, second white balance gains in the actual photography are calculated. The flow advances to step S6. In step S6, correction amounts are calculated using the first control values calculated and stored in step S3 and differences between the first white balance gains calculated in step S3 and the second white balance gains calculated in step S5. In step S7, the first control values are corrected on the basis of the correction amounts, thereby obtaining second control values. In step S9, the white balance of actually photographed image sensing data is adjusted on the basis of the second control values calculated in step S8. The image sensing data having undergone the white balance adjustment is subjected to color processing in step S9 and is subjected to coding in step S10. The coded image data is converted into a file in step S11 and is stored in the storage medium 30.

As described above, the second white balance control values to be supplied to the white balance adjuster 1105 are obtained by comparing the amount of photoflash light in white-paper photography shown in FIG. 3 with that in an actual photography, calculating white balance gain differences, and correcting the white balance gains in white-paper photography by the differences. Accordingly, even if the amount of photoflash light in white-paper photography is different from that in an actual photography, the white balance can be adjusted more accurately.

In the first embodiment, calculation in comparing the amount of photoflash light in white-paper photography with that in an actual photography is performed by obtaining white balance gain differences. A calculation method is not limited to this. Any calculation method may be used as far as the correlation can be obtained. For example, differences between the reciprocals of white balance gains may be calculated.

In the first embodiment, the flashing information to be supplied from the flashgun controller 27 is the amount of photoflash light. The present invention, however, is not limited to this. Any information may be used as far as it indicates fluctuations in color temperature of the flashbulb of the electronic flash unit 32.

For example, data which correlates the amount of photoflash light of the electronic flash unit 32 with the flashing voltage may be stored, as shown in FIG. 4. FIG. 4 depicts a table for explaining an example of the relationship between the flashing voltage of the electronic flash unit 32, the amount of photoflash light, and the white balance gains. In this case, even if the flashing voltage is input from the electronic flash unit 32 instead of the amount of photoflash light in the first embodiment, white balance gains can be obtained, similarly to the above-mentioned process.

It is known that flat photoflash has a color temperature lower than that of flash light. A table as shown in FIG. 3 or 4 may be provided for each of flash light and flat light.

The photoflash light color temperature may be derived from information including the amount of photoflash light, flashing voltage, and the like within the electronic flash unit 32, and the photoflash light color temperature may be supplied as the flashing information in photoflash light. In this case, the flashing amount calculator 1102 has a table which correlates the photoflash light color temperature with the white balance gains and outputs white balance gains corresponding to an input photoflash light color temperature. This case is the same as the first embodiment except that the photoflash light color temperature is input as the flashing information instead of the amount of photoflash light in the first embodiment. For this reason, processing can be performed in the same manner as in the first embodiment.

Image sensing data having undergone white balance adjustment in the white balance adjuster 1105 is subjected to final color adjustment including color matrix conversion, color correction processing, and the like in a color processor 1106 in the subsequent stage. After that, a coding processor 1107 codes the image sensing data in a recording format. The coded data is converted into file data by a recording and filing processor 1108 and is stored as an image file in the storage medium 30.

As described above, according to the first embodiment, even if the amount of photoflash light of an electronic flash is different between actual image photography and white-paper photography for obtaining control values for white balance adjustment, the control values for white balance adjustment are corrected in accordance with a variation of the amount of photoflash light of the electronic flash. This makes it possible to eliminate a problem in white balance adjustment caused by the variation of the amount of photoflash light of the electronic flash.

Second Embodiment

Figure 7:
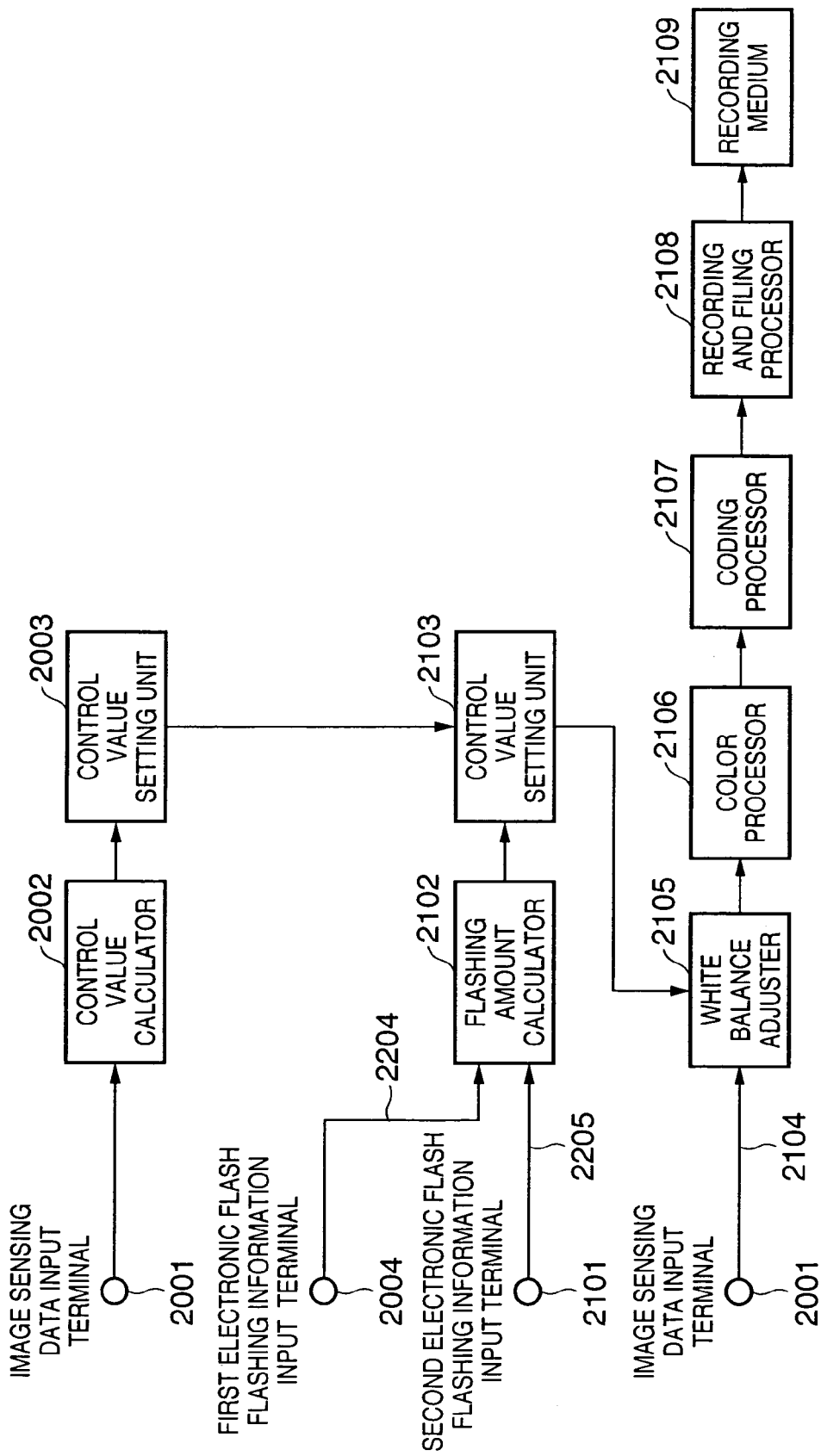
FIG. 7 is a functional block diagram for explaining MWB control using white-paper image sensing by an image sensing apparatus according to the second embodiment of the present invention.
Figure 10:
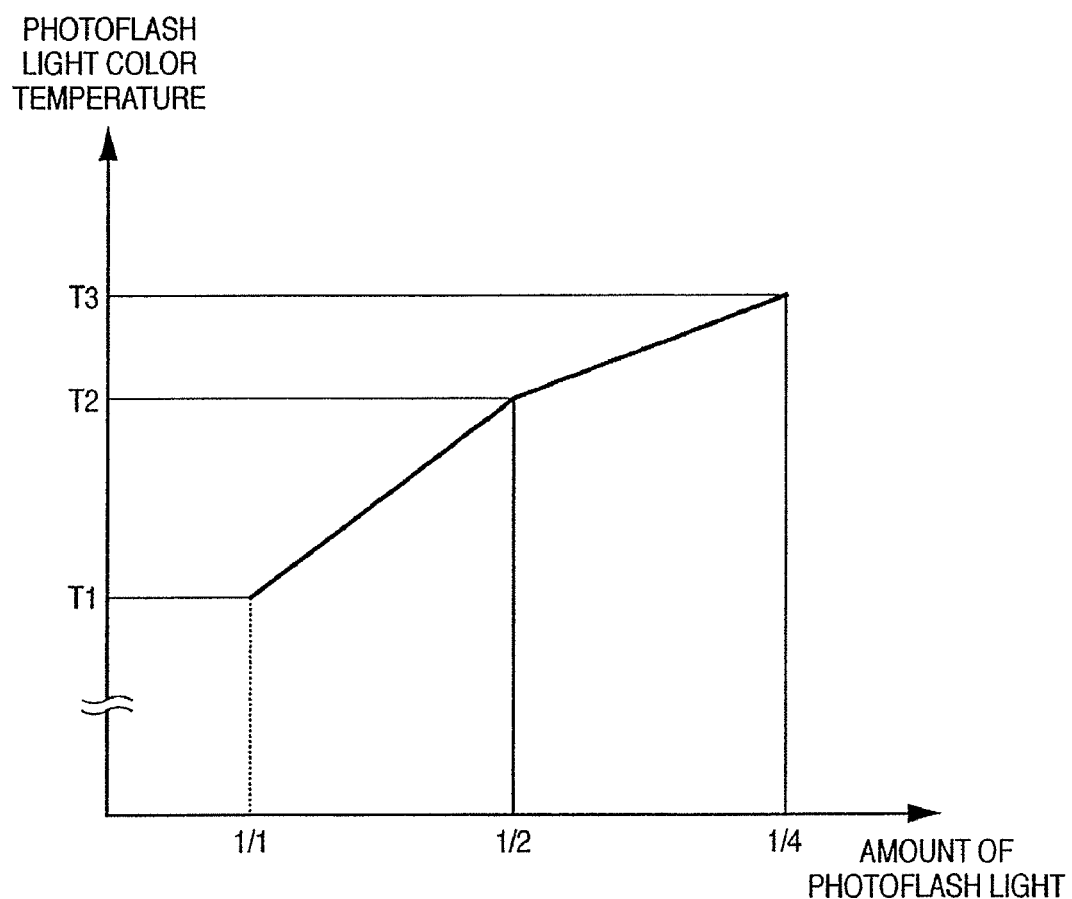
FIG. 10 is a graph showing the relationship between the amount of photoflash light of an electronic flash and the photoflash light color temperature.

FIG. 7 is a functional block diagram showing the main functional arrangement of an image sensing apparatus at the time of MWB control using white-paper image sensing according to the second embodiment of the present invention. The second embodiment will describe a case wherein an electronic flash used in white-paper photography is different from one used in regular photography. The arrangement of the image sensing apparatus according to the second embodiment is the same as that in the first embodiment (FIG. 1) except that an electronic flash device is provided in addition to a flashgun controller 27 and electronic flash unit 32, and a description thereof will be omitted.

An image sensing data input terminal 2001 receives image sensing data obtained by sensing an image by image sensing devices 14 comprising four color filters of R, G1, G2, and B, as shown in FIG. 5, and converting the image into digital data. A control value calculator 2002 extracts partial data (white-paper data) from image sensing data obtained by photographing an achromatic image (white-paper image) which is input from the image sensing data input terminal 2001. The control value calculator 2002 calculates a first white balance control value. At this time, the control value calculator 2002 calculates the first white balance control value for each of color signals R, G1, G2, and B such that the proportions of the average values of white-paper data of the color signals are equal to each other. A control value setting unit 2003 stores the first white balance control values obtained from the control value calculator 2002 in a RAM 192. In subsequent photography, the white balance of image sensing data can be adjusted using the first white balance control values stored by the control value setting unit 2003.

A flashing information input terminal 2004 receives flashing information 2204 from the first electronic flash device. The flashing information 2204 includes control information such as the amount of photoflash light, flashing voltage, and the like in photoflash in the first electronic flash device. A flashing information input terminal 2101 receives flashing information 2205 from the second electronic flash device. The flashing information 2205 includes control information such as the amount of photoflash light, flashing voltage, and the like in photoflash in the second electronic flash device. A flashing amount calculator 2102 has a table representing the relationship between the flashing information 2204 and flashing information 2205 and the white balance gains that pertain to the white balance control values. The flashing amount calculator 2102 outputs the white balance gains corresponding to the input flashing information 2204 and 2205. A control value setting unit 2103 corrects the first white balance control values for the color signals R, G1, G2, and B set by the control value setting unit 2003 on the basis of the white balance gains obtained from the flashing amount calculator 2102. With this correction, second white balance control values for the color signals R, G1, G2, and B are calculated.

Image sensing data 2104 is input through the image sensing data input terminal 2001. A white balance adjuster 2105 performs white balance adjustment for the image sensing data input from the image sensing data input terminal 2001 on the basis of the second white balance control values obtained from the control value setting unit 2103.

FIG. 8 depicts a table for explaining the relationship between the amount of photoflash light of the first electronic flash device and the white balance gains.

FIG. 9 depicts a table for explaining the relationship between the amount of photoflash light of the second electronic flash device and the white balance gains.

A white balance gain RGain is obtained by normalizing a white balance control value for R with G. A white balance gain BGain is obtained by normalizing a white balance control value for B with G. FIGS. 8 and 9 depict white balance gains. If the amount of photoflash light is large, the control values are corrected to the lower color temperature side such that RGain becomes small (R00<R01<R02<R03<R04, R10<R11<R12<R13<R14), and BGain becomes large (B00>B01>B02>B03>B04, B10>B11>B12>B13>B14). On the other hand, if the amount of photoflash light is small, the control values are corrected to the higher color temperature side such that RGain becomes large, and BGain becomes small.

In this example, a case will be described wherein the amount of photoflash light of the first electronic flash device in white-paper photography is "1/1", and that of the second electronic flash device in regular photography is "1/2".

If the amount of photoflash light is "1/1" in white-paper photography, the flashing information 2204 indicating that the amount of photoflash light is "1/1" is input from the first electronic flash device to the flashing amount calculator 2102. White balance gains (R00,B00) are selected from FIG. 8. Simultaneously with this, the control value calculator 2002 calculates first white balance control values on the basis of image sensing data (white-paper photographing data) output from the image sensing data input terminal 2001. The control value setting unit 2003 stores the first white balance control values for later MWB calculation.

In an actual photography, the flashing information 2205 indicating that the amount of photoflash light is "1/2" is input from the second electronic flash device to the flashing amount calculator 2102. Then, a set of values (R11,B11) in FIG. 9 are selected as the white balance gains. At this time, white balance gain differences ($\Delta R, \Delta B$) extracted from the amounts of flashing of two types are represented as follows:

$$\Delta R = R11 - R00$$

$$\Delta B = B11 - B00$$

The control value setting unit 2103 corrects white balance gains (Ra,Ba) set by the control value setting unit 2003 by the white balance gain differences. With this correction, white balance gains (Rb,Bb) after correction are represented as follows:

$$Rb = Ra + \Delta R$$

$$Bb = Ba + \Delta B$$

The white balance gains (Rb,Bb) having undergone correction in the control value setting unit 2103 are converted into second white balance control values and are sent to the white balance adjuster 2105.

When the image sensing data 2104 in actual photography is input from the image sensing data input terminal 2001, the white balance adjuster 2105 performs white balance adjustment for the image sensing data using the second white balance control values set by the control value setting unit 2103.

The processing in the second embodiment can be performed in the same manner as in the first embodiment along with the flowchart in FIG. 6. More specifically, in step S1, the first electronic flash device emits light. In step S4, photographing is performed using the second electronic flash device. In steps S5 and S6, white balance gain differences are calculated on the basis of the flashing information of the first and second electronic flash devices. The processing can be performed in the same manner as in the first embodiment by correcting the first control values by the differences and obtaining the second control values.

As described above, according to the second embodiment, the second white balance control values supplied to the white balance adjuster 2105 are obtained by correcting the first control values based on the white balance gains in whitepaper photography on the basis of the data shown in FIGS. 8 and 9 and white balance gain differences caused by differences in amounts of flashing between the first electronic flash device in white-paper photography and the second electronic flash device in actual photography.

Accordingly, even if the electronic flash device in whitepaper photography is different from that in actual photography, white balance can be adjusted mote accurately. Even if the amount of photoflash light in white-paper photography is different from that in the actual photography, white balance can be adjusted more accurately.

In the second embodiment, in correction based on the amount of photoflash light of the first electronic flash device in white-paper photography and that of the second electronic device in an actual photography, correction values are calculated by obtaining white balance gain differences. The present invention, however, is not limited to this. Any calculation method may be used as far as the correlation can be obtained. For example, differences between the reciprocals of white balance gains may be calculated.

In the second embodiment, the flashing information to be supplied from each electronic flash device is the amount of photoflash light. The present invention, however, is not limited to this. Any information may be used as far as it indicates fluctuations in color temperature of the flashbulb of the electronic flash device. For example, the information may be a two-dimensional table of the amount of photoflash light and flashing voltage. It is generally known that flat photoflash has a color temperature lower than that of flash light. A table as described above may be provided for each of flash light and flat light.

The photoflash light color temperature may be derived from information including the amount of photoflash light, flashing voltage, and the like within each photoflash, and the photoflash light color temperature may be supplied as the flashing information in photoflash light. In this case, the flashing amount calculator 2102 has a table of the photoflash light color temperature and the white balance gains.

Image sensing data having undergone white balance adjustment in the white balance adjuster 2105 is subjected to final color adjustment including color matrix conversion, color correction processing, and the like in a color processor 2106 in the subsequent stage. After that, a coding processor 2107 codes the image sensing data in a recording format. The coded data is converted into file data by a recording and filing processor 2108 and is stored as an image file in a storage medium 30.

Other Embodiment

An electronic flash device serving as a light emission means may be an integral-type one physically connected to the main body of a camera. Alternatively, the electronic flash device may be detachable from the camera body as far as it can electrically communicate with the camera body. The electronic flash device may be replaced with ones with various characteristics. Flashing information can be input from the electronic flash device by communication in the above-mentioned manner. The input of the flashing information is performed by electrical communication. The electrical communication may be wireless communication using, e.g., infrared rays. If remote control through electrical communication is possible, a camera system comprising a camera, electronic flash device, and the like may be used.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The object of the present invention is also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit. For example, execution of the processing by drivers on a PC corresponds to such case.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This patent application claims priority from Japanese Patent Application No. 2004-003208 filed on Jan. 8, 2004, which is hereby incorporated by reference herein.

What is claimed is:

1. An image sensing apparatus comprising: light-emitting means for irradiating an object with light; input means for inputting flashing information of said light-emitting means; image sensing means, comprising a plurality of color filters with different spectral characteristics, for converting light from the object to obtain image sensing data; first white balance control data generation means for generating first white balance control data on the basis of first image sensing data obtained by image-sensing a first object by said image sensing means using said light-emitting means; second white balance control data generation means for generating second white balance control data obtained by correcting the first white balance control data, on the basis of a difference between a white balance gain corresponding to first flashing information of said light-emitting means when the first object is image-sensed and a white balance gain corresponding to second flashing information of said light-emitting means when a second object is to be photographed, the first flashing information and second flashing information being input from said input means; and white balance adjustment means for adjusting white balance of image sensing data obtained by image-sensing the second object, on the basis of the second white balance control data.

2. The apparatus according to claim 1, wherein said light-emitting means includes an electronic flash, and each of the first flashing information and second flashing information includes at least one of an amount of photoflash light of the electronic flash, a voltage across a flashbulb of the electronic flash, and a parameter that pertains to whether the electronic flash is flash light.

3. The apparatus according to claim 1, wherein said first white balance control data generation means generates the first white balance control data on the basis of one of representative values of data for respective color components for at least some of the first image sensing data and data of average values of the respective color components.

4. An image sensing apparatus comprising:
first and second light-emitting means for irradiating an object with light;
input means for inputting flashing information of said first and second light-emitting means;
image sensing means, comprising a plurality of color filters with different spectral characteristics, for converting light from the object to obtain image sensing data;
first white balance control data generation means for generating first white balance control data on the basis of first image sensing data obtained by image-sensing a first object by said image sensing means using said first light-emitting means;
second white balance control data generation means for generating second white balance control data obtained by correcting the first white balance control data, on the basis of a difference between a white balance gain corresponding to first flashing information of said first light-emitting means when the first object is image-sensed and a white balance gain corresponding to second flashing information of said second light-emitting means when a second object is to be photographed, the first flashing information and second flashing information being input from said input means; and
white balance adjustment means for adjusting white balance of image sensing data obtained by image-sensing the second object, on the basis of the second white balance control data.

5. The apparatus according to claim 4, wherein each of said first and second light-emitting means includes an electronic flash, and each of the first flashing information and second flashing information includes at least one of an amount of photoflash light of the electronic flash, a voltage across a flashbulb of the electronic flash, and a parameter that pertains to whether the electronic flash is flash light.

6. The apparatus according to claim 4, wherein said first white balance control data generation means generates the first white balance control data on the basis of one of representative values of data for respective color components for at least some of the first image sensing data and data of average values of the respective color components.

7. An image sensing method in an image sensing apparatus, comprising:
- an inputting step of inputting flashing information of a light-emitting unit which irradiates an object with light;
- an image sensing step of converting light from the object using a plurality of color filters with different spectral characteristics to obtain image sensing data;
- a first white balance control data generation step of generating first white balance control data on the basis of first image sensing data obtained by image-sensing a first object using the light-emitting unit in said image sensing step;
- a second white balance control data generation step of generating second white balance control data obtained by correcting the first white balance control data, on the basis of a difference between a white balance gain corresponding to first flashing information of the light-emitting unit when the first object is image-sensed and a white balance gain corresponding to second flashing information of the light-emitting unit when a second object is to be photographed, the first flashing information and second flashing information being input in said inputting step; and
- a white balance adjustment step of adjusting white balance of image sensing data obtained by image-sensing the second object, on the basis of the second white balance control data.

8. The method according to claim 7, wherein the light-emitting unit includes an electronic flash, and each of the first flashing information and second flashing information includes at least one of an amount of photoflash light of the electronic flash, a voltage across a flashbulb of the electronic flash, and a parameter that pertains to whether the electronic flash is flash light.

9. The method according to claim 7, wherein in said first white balance control data generation step, the first white balance control data is generated on the basis of one of representative values of data for respective color components for at least some of the first image sensing data and data of average values of the respective color components.

10. An image sensing method in an image sensing apparatus, comprising:
- an inputting step of inputting flashing information of a first light-emitting unit and second light-emitting unit which irradiate an object with light;
- an image sensing step of converting light from the object using a plurality of color filters with different spectral characteristics to obtain image sensing data;
- a first white balance control data generation step of generating first white balance control data on the basis of first image sensing data obtained by image-sensing a first object using the first light-emitting unit in said image sensing step;
- a second white balance control data generation step of generating second white balance control data obtained by correcting the first white balance control data, on the basis of a difference between a while balance gain corresponding to first flashing information of the first light-emitting unit when the first object is image-sensed and a white balance gain corresponding to second flashing information of the second light-emitting unit when a second object is to be photographed, the first flashing information and second flashing information being input in said inputting step; and
- a white balance adjustment step of adjusting white balance of image sensing data obtained by image-sensing the second object, on the basis of the second white balance control data.

11. The method according to claim 10, wherein each of the first and second light-emitting units includes an electronic flash, and each of the first flashing information and second flashing information includes at least one of an amount of photoflash light of the electronic flash, a voltage across a flashbulb of the electronic flash, and a parameter that pertains to whether the electronic flash is flash light.

12. The method according to claim 10, wherein in said first white balance control data generation step, the first white balance control data is generated on the basis of one of representative values of data for respective color components for at least some of the first image sensing data and data of average values of the respective color components.

13. A storage medium storing a computer-executable program for causing a computer to carry out the image sensing method as defined in claim 10.

14. An image sensing system, comprising:
- a light-emitting unit electrically connected to an image sensing apparatus and configured to irradiate an object with light;
- an input unit configured to input flashing information of said light-emitting unit;
- an image sensing unit, comprising a plurality of color filters with different spectral characteristics, configured to convert light from the object to obtain image sensing data;
- a first white balance control data generation unit configured to generate first white balance control data on the basis of first image sensing data obtained by image-sensing a first object by said image sensing unit using said light-emitting unit;
- a second white balance control data generation unit configured to generate second white balance control data obtained by correcting the first white balance control data, on the basis of a difference between a white balance gain corresponding to first flashing information of said light-emitting unit when the first object is image-sensed and a white balance gain corresponding to second flashing information of said light-emitting unit when a second object is to be photographed, the first flashing information and second flashing information being input from said input unit; and
- a white balance adjustment unit configured to adjust white balance of image sensing data obtained by image-sensing the second object, on the basis of the second white balance control data.

15. An image sensing system, comprising:
- a light-emitting unit connected to an image sensing apparatus and configured to irradiate objects with light, the light-emitting unit including at least a communications unit;
- the communications unit being configured to transmit flashing information from said light-emitting unit to the image sensing apparatus, the image sensing apparatus comprising:
- an image sensing unit configured to convert light reflected from the objects to obtain image sensing data, the image sensing unit including at least a plurality of color filters each of the color filters with different spectral characteristics;

a first white balance control data generation unit configured to generate first white balance control data based on the image sensing data obtained by image-sensing a first object using said image sensing unit when said light-emitting unit irradiates the first object;

a second white balance control data generation unit configured to generate second white balance control data, the second white balance control data obtained by correcting the first white balance control data on the basis of a difference between a white balance gain corresponding to first flashing information obtained from said light-emitting unit when the first object is image-sensed and a white balance gain corresponding to second flashing information obtained from said light-emitting unit when a second object is photographed, the first flashing information and the second flashing information being input from said communications unit; and a white balance adjustment unit configured to adjust white balance of image sensing data obtained by image-sensing the second object, wherein the second white balance control data is utilized to adjust said white balance of said image sensing data obtained by image-sensing the second object.

* * * * *